United States Patent
Michiels et al.

(10) Patent No.: US 12,246,492 B2
(45) Date of Patent: Mar. 11, 2025

(54) DEVICE FOR PROVIDING A TUBULAR FOIL

(71) Applicant: SLEEVE TECHNOLOGY B.V, Deurne (NL)

(72) Inventors: Rick Elisabeth Josephus Petronella Michiels, Deurne (NL); Ramon Henricus Marta Van Dam, Deurne (NL)

(73) Assignee: SLEEVE TECHNOLOGY, B.V, Deurne (NL)

( * ) Notice: Subject to any disclaimer, the term of this patent is extended or adjusted under 35 U.S.C. 154(b) by 101 days.

(21) Appl. No.: 17/920,936

(22) PCT Filed: Apr. 26, 2021

(86) PCT No.: PCT/IB2021/053405
§ 371 (c)(1),
(2) Date: Oct. 24, 2022

(87) PCT Pub. No.: WO2021/214736
PCT Pub. Date: Oct. 28, 2021

(65) Prior Publication Data
US 2023/0173765 A1    Jun. 8, 2023

(30) Foreign Application Priority Data

Apr. 24, 2020  (NL) .................................... 2025423

(51) Int. Cl.
*B29C 65/00*  (2006.01)
*B29C 65/50*  (2006.01)
(Continued)

(52) U.S. Cl.
CPC ...... *B29C 66/1122* (2013.01); *B29C 65/5042* (2013.01); *B29C 65/5092* (2013.01);
(Continued)

(58) Field of Classification Search
CPC ............. B29C 66/1122; B29C 66/5221; B29C 66/863; B29C 66/83221; B29L 2023/001; B65H 2301/46222
(Continued)

(56) References Cited

FOREIGN PATENT DOCUMENTS

| DE | 10 2015 215228 A1 | 2/2017 |
|---|---|---|
| EP | 1 201 585 A1 | 5/2002 |

(Continued)

OTHER PUBLICATIONS

International Search Report corresponding to International Application No. PCT/IB2021/053405 dated Aug. 24, 2021.
(Continued)

*Primary Examiner* — James D Sells
(74) *Attorney, Agent, or Firm* — Jenkins, Taylor & Hunt, P.A.

(57) ABSTRACT

A device for providing a tubular foil comprises a frame (5) with a position for an active product holder (P4) from which the tubular foil (10) can be removed and at least one further position (P1-P5) for at least one subsequent product holder with a subsequent tubular foil (20). The device provides coupling means for attaching a leading end (25) of the subsequent tubular foil (20) to a tail end (15) of a spent tubular foil (10). The coupling means comprise a carriage (110) with a drivable applicator device (100). The applicator device comprises a set of opposite applicator members (130) with mutually facing operative surfaces (135) and can be manipulated between a spread position, wherein the operative surfaces lie removed from each other, and a clamping position wherein the operative surfaces lie clampingly on each other. The applicator device (100) further comprises supply means for providing adhesive strips (60) in the spread position, and can be controlled to bring the applicator members (130) with the adhesive strips (60) into the clamp- (Continued)

ing position, with interposing of the tail end (15) of the spent tube (10) and the leading end (25) of the subsequent tube (20), in order to mutually connect the ends (15, 25), and to bring the applicator members into the spread position in order to release the ends with the adhesive strips.

18 Claims, 6 Drawing Sheets

(51) Int. Cl.
  *B65H 19/18* (2006.01)
  *B29L 23/00* (2006.01)
(52) U.S. Cl.
  CPC .... *B29C 66/5221* (2013.01); *B29C 66/83221* (2013.01); *B29C 66/853* (2013.01); *B65H 19/1852* (2013.01); *B29L 2023/001* (2013.01); *B65H 2301/46015* (2013.01); *B65H 2301/46212* (2013.01); *B65H 2301/46222* (2013.01); *B65H 2301/4631* (2013.01); *B65H 2301/46412* (2013.01)

(58) Field of Classification Search
  USPC ........................................................ 156/73.1
  See application file for complete search history.

(56) References Cited

FOREIGN PATENT DOCUMENTS

| | | |
|---|---|---|
| EP | 2 825 491 A1 | 1/2015 |
| JP | S59 91822 U | 6/1984 |
| JP | 2014 058149 | 4/2014 |
| WO | WO 2013/137738 A1 | 9/2013 |
| WO | WO-2017025218 A1 * | 2/2017 |

OTHER PUBLICATIONS

Written Opinion of the International Searching Authority corresponding to International Application No. PCT/IB2021/053405 dated Aug. 24, 2021.

* cited by examiner

DEVICE FOR PROVIDING A TUBULAR FOIL

CROSS REFERENCE TO RELATED APPLICATIONS

This application is a national stage filing of PCT International Application No. PCT/IB2021/053405, filed Apr. 26, 2021, which is based on and claims priority to Netherlands Patent Application No. 2025423, filed Apr. 24, 2020.

The present invention relates to a device for providing a tubular foil, comprising a frame with a position for an active product holder from which the tubular foil can be removed and at least one further position for at least one subsequent product holder with a subsequent tubular foil, comprising coupling means for attaching a leading end of the subsequent tubular foil to a tail end of a spent tubular foil, wherein the coupling means comprise a carriage onto which the tail end can be fixed, and wherein the carriage is controllable so as to bring the tail end of the spent tubular foil and the leading end of the subsequent tubular foil together.

The stated tubular foil is particularly a tubular foil for providing a sleeve around bottles or similar objects. The foil used for this purpose usually comprises a shrink wrap which shrinks around the product to be covered under the influence of heat and then connects closely thereto. This provides the option of transferring from a flat, printable state of the tubular foil a print applied thereto to a three-dimensional form.

In use of such a tubular foil it is usually unwound from a roll in flat state. When the roll reaches the tail end of the active tubular foil, it is desirable for this tail end to be connected to the start of a subsequent tubular foil present on a subsequent roll, this such that the process of arranging sleeves on subsequent products is not interrupted. For this purpose the tail end of the spent tubular foil is connected to the leading end of the subsequent tubular foil. For this purpose the two ends must be positioned accurately relative to each other, both in longitudinal direction and in transverse direction. This requires a complicated device which is sensitive to malfunction. If accurate positioning does not take place, malfunctions may occur not only in the device itself, but also in the subsequent machine used to arrange sleeves around the products.

A device of the type described in the preamble is for instance known from American patent U.S. Pat. No. 6,733,609. In this known device a mouth is formed at the leading end of the subsequent tubular foil by providing the longitudinal sides with an obliquely cut-way corner obliquely at their outer end. This creates a set of separate tongues at the leading end of the subsequent tubular foil, into which the tail end is slid and then fixed by fusing the tongues and the tail end together. In order to prevent a back side and upper side of the tubular foil from also sticking together here, a beak which holds these two sides apart lies therebetween. The beak lies inside the spent tubular foil which is pulled thereover. The beak is supported externally by a system of rollers and is also provided internally with a roller for the purpose of a smooth guiding of the tubular foil running thereover.

Although the known device thus enables continuous operation of a subsequent device by having already attached a subsequent tubular foil to a spent tubular foil immediately thereafter, the beak provided therein for this purpose is a vulnerable component that makes the device sensitive to malfunction. Placing into each other, fusing and then cooling of the two ends furthermore takes a relatively large amount of time and energy in this known device.

The present invention therefore has for its object, among others, to provide a device for providing a tubular foil which obviates these and other drawbacks to an at least significant extent.

In order to achieve the stated object a device of the type described in the preamble for providing a tubular foil has the feature according to the invention that the carriage comprises a drivable applicator device with opposite applicator members with mutually facing operative surfaces, that the applicator members can be manipulated between a spread position, wherein the operative surfaces lie removed from each other, and a clamping position wherein the operative surfaces lie clampingly on each other, that the applicator device comprises supply means for providing adhesive strips on the operative surfaces of the applicator members in the spread position, and that the applicator device can be controlled to bring the applicator members with the adhesive strips thereon into the clamping position, with interposing of the tail end of the spent tube and the leading end of the subsequent tube, in order to mutually connect the ends between the adhesive strips, and to bring the applicator members into the spread position in order to release the adhesive strips and the ends mutually connected thereby.

The device according to the invention thus provides a set of adhesive strips whereby the adjacent outer ends are connected to each other into a continuous whole. The adhesive strips are provided on the operative surface of the carriage by the supply means while the applicator members are in the spread position. A position of the adhesive strips and the fixed position of the tail end can here already be adjusted to each other so that they are already mutually aligned. While the applicator members are in the spread position, the carriage brings the tail end and the leading end of a subsequent tubular foil together, after which the applicator device is controlled to take on successively the clamping position and the spread position, herein clamping together the ends between the adhesive strips and thus connecting the assembly. Not only is this attachment almost immediate; no complicated intermediate body which is sensitive to malfunction, such as the beak of the known device, is required therefor either.

With a view to mutually attaching a number of successive tubular foils a particular embodiment of the device has the feature according to the invention that the supply means comprise for each of the operative surfaces a roll of adhesive tape which is provided with a drivable cutting device which, when driven, is able and configured to detach the adhesive strip from the adhesive tape. A plurality of adhesive strips can thus be separated from a rolled-up length of adhesive tape, and the adhesive tape need only be replenished once every number of operations.

The adhesive strips have on their free side facing away from the operative surface a sticky adhesive layer. In order to displace the adhesive tape to the operative surface the supply means can be equipped with a driven transport wheel which forces the tape onto the operative surface. In this case this transport wheel engages on the adhesive side of the adhesive tape. In order to therein limit a mutual adhesion to a minimum and prevent deposition of adhesive on the transport wheel a further particular embodiment of the device has the feature according to the invention that the supply means comprise a driven transport wheel between the tape holder and the cutting device for the purpose of carrying the adhesive tape a strip length beyond the cutting device, which transport wheel has transversely of a transport direction a curved, particularly convex or concave, running surface.

In order to fix the adhesive strips on the operative surfaces a preferred embodiment of the device has the feature according to the invention that the applicator members are provided with drivable attaching means which are able and configured when driven to have the operative surface exert an attractive force engaging on the adhesive strip. When driven, the attaching means will pull the adhesive strip against the operative surface and hold it in position thereon. This attachment is semi-permanent and will be eliminated when the driving is released. The product can thus finally also be released again.

Such a semi-permanent, i.e. controllable and releasable, attachment can be realized in various ways, for instance mechanically, electromagnetically, but also pneumatically. In this respect particularly good results have been achieved with a further preferred embodiment of the device according to the invention, characterized in that the attaching means comprise an underpressure chamber on a back side of the operative surface, which underpressure chamber is coupled to a suction device which is able and configured to maintain a sub-atmospheric underpressure in the underpressure chamber, wherein the operative surface is air-permeable and is in open communication with the underpressure chamber on the back side. The adhesive strip will here be pressed against the operative surface by the application of an underpressure in the underpressure chamber, also referred to as vacuum chamber. By eliminating the underpressure in the underpressure chamber the adhesive strip is released again.

A particular further preferred embodiment of the device according to the invention is characterized in that each of the operative surfaces is displaceable between a starting position, in which the adhesive strip is received, and a delivery position in which the adhesive strip is delivered. The device is thus able to displace an adhesive strip, once it has been delivered onto the operative surface, to a correct delivery position below or above the tail end, and to align it therewith. With a view to the latter, a further embodiment of the device has the feature according to the invention that a sensor is provided for each operative surface for the purpose of detecting the tail end, and that the operative surface and the sensor are coupled to a control device in order to align the delivery position with the tail end.

A further embodiment of the device according to the invention is characterized here in that the operative surface is displaceable between a starting position, in which the adhesive tape is received, and a position in which the adhesive strip is detached from the adhesive tape. Use is thus advantageously made of the displaceability of the operative surface by displacing the operative surface slightly and so pulling the adhesive tape taut before cutting off the adhesive strip or otherwise separating it therefrom. This produces a sharper and more well-defined cut and reduces the danger of malfunction.

In a particularly practical embodiment of the device according to the invention the operative surface is laterally displaceable in controlled manner in that each of the operative surfaces comprises a part of a running surface of a driven endless belt. By thus driving the relevant endless belt the adhesive strip can ultimately be positioned particularly accurately.

In a further particular embodiment the device is characterized according to the invention in that the frame comprises at each position a suspension for a rotating roll from which the tubular foil can be unwound. Each roll provides here a tubular foil with a leading end which can be attached to the tail end of a spent tubular foil to form a continuous whole. A further particular embodiment of the device has the feature here according to the invention that the frame comprises at each position a support surface for a subsequent tubular foil, on which the leading end of the tubular foil in question can be received, and that the support surface is provided with drivable fixation means which are able and configured when driven to fix the leading end in a defined position, particularly in a flat state of the tubular foil. Not only is the tail end in the carriage thus situated at a defined, or at least known, position, the position of the leading end of the subsequent tubular foil is also established. A control of the device can accommodate both positions in a displacement to be imparted to the carriage.

In a further particular embodiment the device is characterized according to the invention in that the leading end of the subsequent roll has a mouth accessible to the tail end, that spreading means are provided to open the mouth of the leading end, and that the carriage is able and configured to place the tail end of the active roll inside the opened mouth of the subsequent roll. Such a coupling, wherein the tail end is placed into the mouth of the leading end, provides a particularly reliable mutual connection without being detrimental to an active section of the tubular foil.

A further particular embodiment of the device according to the invention is characterized here in that the mouth is laterally accessible to the tail end, that the carriage is guided with the tail end to the leading end in a lateral movement, and that the carriage is able and configured to place the tail end of the active roll laterally inside the opened mouth of the subsequent roll in the lateral movement. The tail end is thus placed inside the mouth of the leading end of the subsequent tubular foil in a smooth movement, which can be performed not only without time loss but also with minimal transmission losses and complexity. In respect of the spreading means which can be applied here in order to hold open the mouth, a further particular embodiment of the device has the feature according to the invention that the spreading means comprise a set of drivable suction nozzles above and under the mouth of the leading end of the subsequent tubular foil.

An applied tubular foil usually has a repeating print; one for each foil sleeve to be detached therefrom. In that case the spent tubular foil and the subsequent tubular foil must be connected to each other while continuing this repeating pattern as much as possible. With a view thereto, a further particular embodiment of the device according to the invention is characterized in that the carriage is provided with drivable fixation means which are able and configured when driven to fix the tail end in a defined position relative to the operative surface. This defined position can here be deduced from a detected print on the spent tubular foil. For this purpose the carriage is advantageously provided with an electronic sensor, such as a camera or photocell, whereby at least one characteristic in the print in the tail end can be detected.

In order to match the two ends to each other in respect of print, a further particular embodiment of the device has the feature according to the invention that the carriage comprises a drivable cutting device having at the position of the operative surfaces a line of operation running transversely of a tube direction, which cutting means are able and configured when driven to shorten the tail end along the line of operation at the position of the operative surface. The tail end can thus be shortened as according to a predefined position in a pattern printed thereon, wherein the leading end can likewise be matched thereto in respect of its print so as to provide an almost uninterrupted continuation of the pattern.

The device according to the invention is advantageously characterized in that an adhesive strip can be provided at each of the operative surfaces while the carriage moves to the subsequent tubular foil. The applicator device has thus already been prepared before the two ends are brought together. The attachment of the two ends can thereby take place almost immediately after the carriage has performed its movement.

In order to have the whole process take place without interruption a further embodiment of the device has the feature according to the invention that the frame comprises a buffer space for receiving therein an end part of the tubular foil which has been unwound from the active roll and which ends in the tail end. A length of the end part is here chosen such that processing of the length of tubular foil in a subsequent machine takes longer than coupling by the device of the tail end to the leading end of the subsequent roll.

The invention will be further elucidated hereinbelow with reference to an exemplary embodiment and an accompanying drawing. In the drawing.

The figures are otherwise purely schematic and not always drawn to the same scale. Some dimensions in particular may be exaggerated to greater or lesser extent for the sake of clarity. Corresponding parts are designated in the figures with the same reference numeral.

Figure 1:
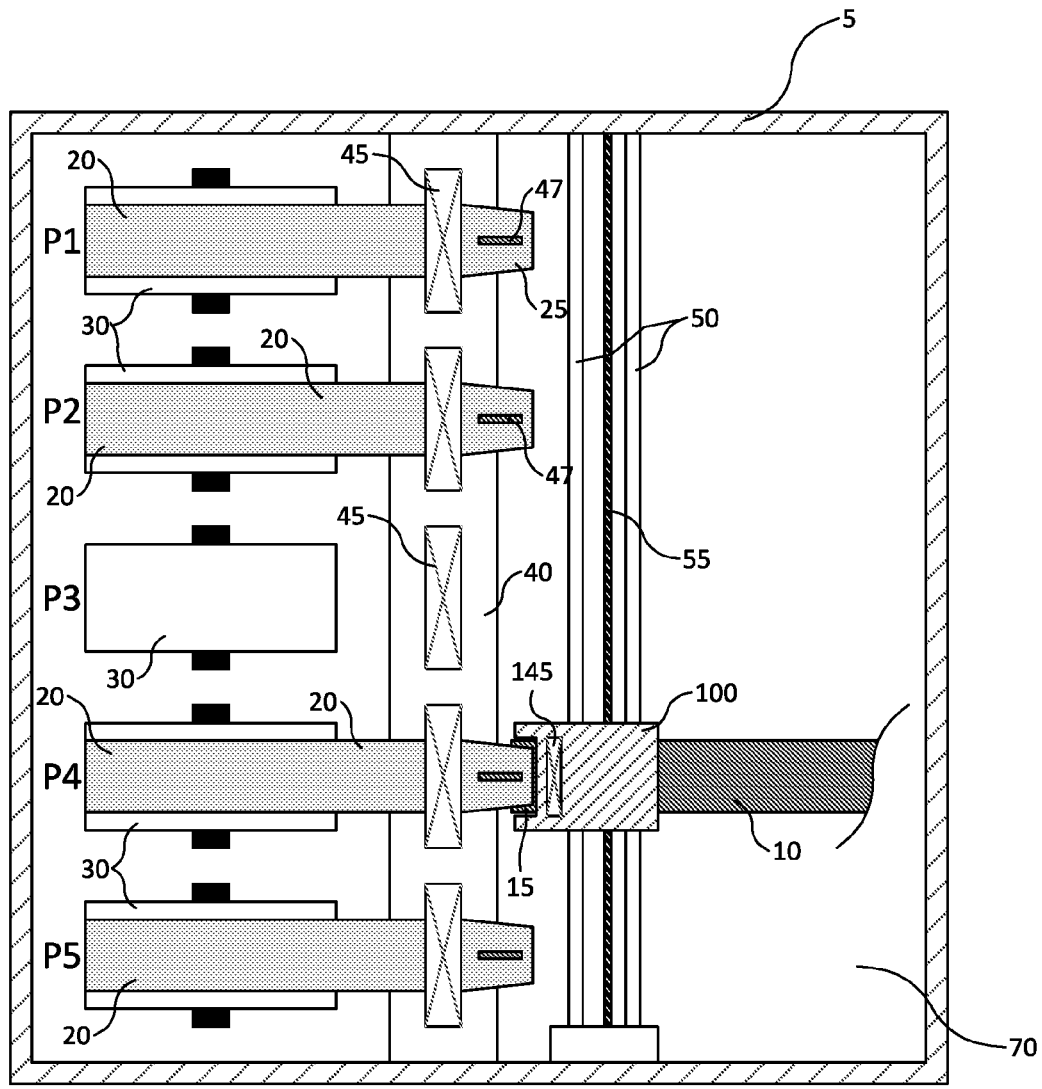
FIG. 1 shows schematically an exemplary embodiment of a device according to the invention.

FIG. 1 shows schematically a device 1 for providing a tubular foil, whereby a tail end 15 of a spent tubular foil 10 can be connected without delay to a leading end 25 of a subsequent tubular foil 20, as further illustrated schematically in FIGS. 2A-2D. Tubular foils 10, 20 are processed by the device in flattened state, but can be developed into an expanded, hollow tunnel. In a subsequent device, individual sleeves can be separated therefrom, which are placed around products to be covered therewith. This is usually a synthetic shrink wrap which can be shrunk tightly around for instance bottles, beverage packagings and similar objects under the influence of heat.

In order to allow this process to take place without interruption, it is important that the tubular foil 10 applied for this purpose is supplied endlessly, at least within a production run. For this purpose device 1 comprises a frame 5 with a number of stock positions P1-P5 in which rolls 30 with subsequent tubular foils 20 are already disposed. In order to connect a tail end 15 of an active, spent tubular foil 10 to a leading end 25 of such a subsequent tubular foil 20 the tail end 15 is clamped onto a carriage of a transport module 100 and carried over a guide 50 to the leading end 25 of the subsequent tubular foil 20, see FIG. 2A.

Figure 2A:
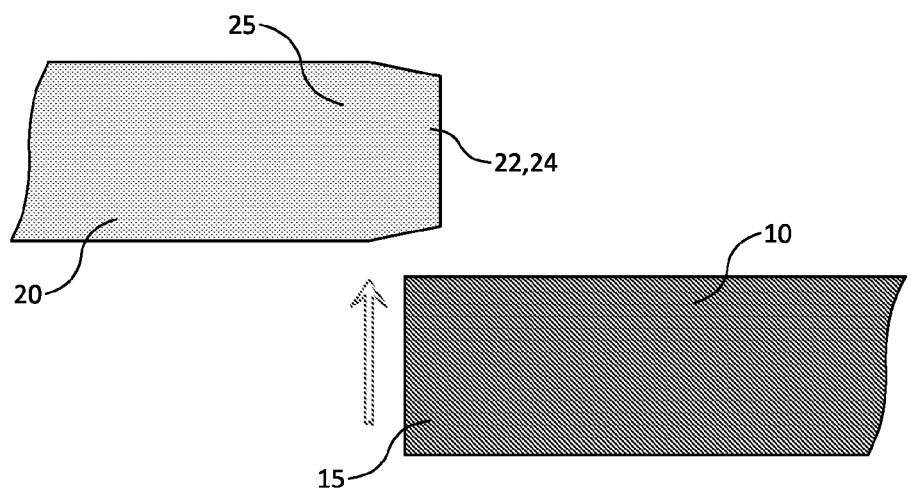
FIGS. 2A-2D show schematically a tail end of a first tubular foil and a leading end of a subsequent tubular foil in successive stages of a realization of a connection therebetween with the device of FIG. 1.
Figure 2B:
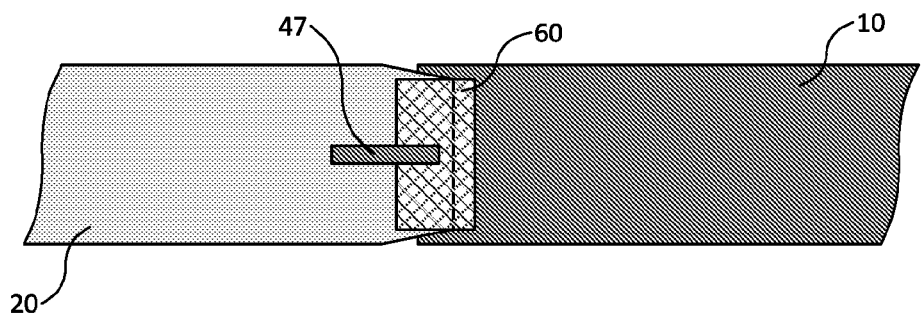
Figure 2C:
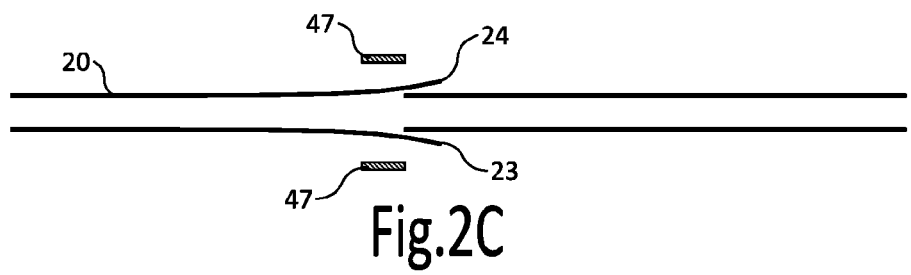
Figure 2D:
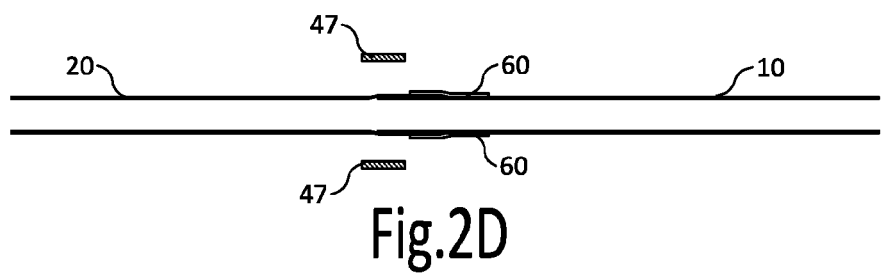

Leading end 25 is pre-prepared by providing it on both longitudinal edges 21 of the flattened tubular foil 20 with chamfered edges so as to form a mouth 22 with a set of free-hanging tongues 23, 24, see also FIG. 2C. The tail end 15 of the active tubular foil 10 is slid laterally between the two tongues 23, 24, as shown schematically by the arrow in FIG. 2A. Mouth 22 is held open by a set of suction nozzles 47 above and below tongues 23, 24, see also FIG. 2C, which draw the tongues 23, 24 toward them. Once in position, the suction force is removed therefrom and adhesive strips 60 are arranged on top of and under the thus formed overlap between the two ends 15, 25 in order to connect the two ends 15, 25 both mechanically and operatively, see FIG. 2D. A clamping 45, 145 of the two tubular foils 10, 20 is then released, and the subsequent tubular foil 20 will take the place of spent tubular foil 10.

Frame 5 is provided with two guides 50 which form a rail for supporting and guiding the carriage of transport module 100. This guide carries the transport module 100 laterally along and to the successive stock positions P1-P5 in a straight line. The transport module is provided with drive means for carrying the transport module to a position P4 where the leading end 25 of a selected subsequent tube 20 is located. Tail end 15 is here also placed laterally between the tongues 23, 24 of that leading end 25. With a view to a correct alignment of the two ends 15, 25 relative to each other the leading end 25 is supported by a support surface which is provided by a table 40 of the frame and is fixed thereon by means of a clamping member 45. The clamping blocks 145 on transport module 100 fix the tail end 15 on the transport module 100. The drive means can for instance be formed by a threaded rod 55 which is motor-driven and is received in a nut 112 which is received fixedly in transport module 100, see FIG. 4, or an independent drive motor which is mounted on the transport module and engages on the guide 50.

During the displacement of transport module 100 a tube transport motor (not further shown), which carries the active tube 10 to an outlet of the device, is switched off. During this standstill of the tube transport motor, tubular foil 10 is taken from a buffer space 70 in which an end part of the active tubular foil 10 with a certain length has accumulated. A subsequent machine for arranging the sleeves on objects can thus remain in uninterrupted operation. As soon as the ends 15, 25 are connected to each other and have been released by clamping members 45, 145, the tube transport motor is switched on again. The tube transport motor can temporarily, for instance initially, be operated at a considerably higher rotation speed than is necessary for a consumption rate of the sleeve machine that follows, and then be adjusted thereto, or can be operated constantly at a slightly higher rotation speed. In both cases a length of tubular foil will accumulate in buffer space 70 so that the buffer stock will be replenished again.

Figure 3:
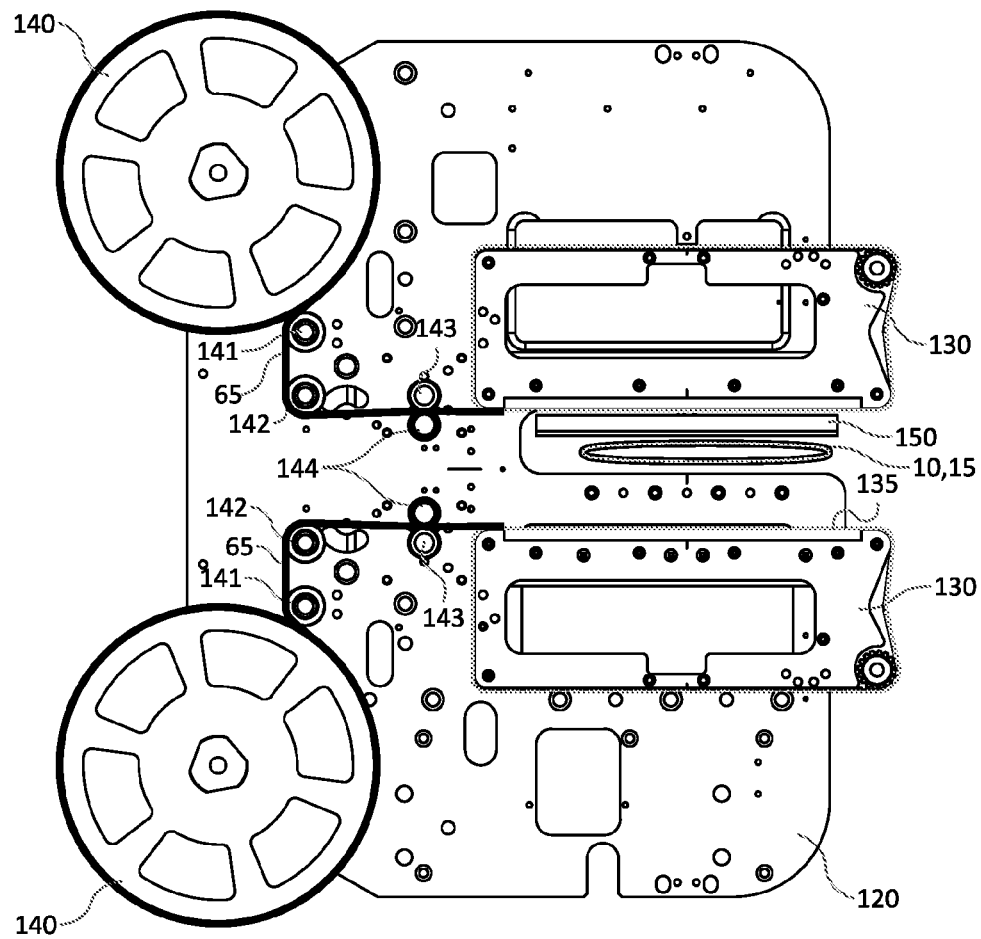
FIG. 3 shows a front view of a transport module with an applicator device of the device of FIG. 1.
Figure 4:
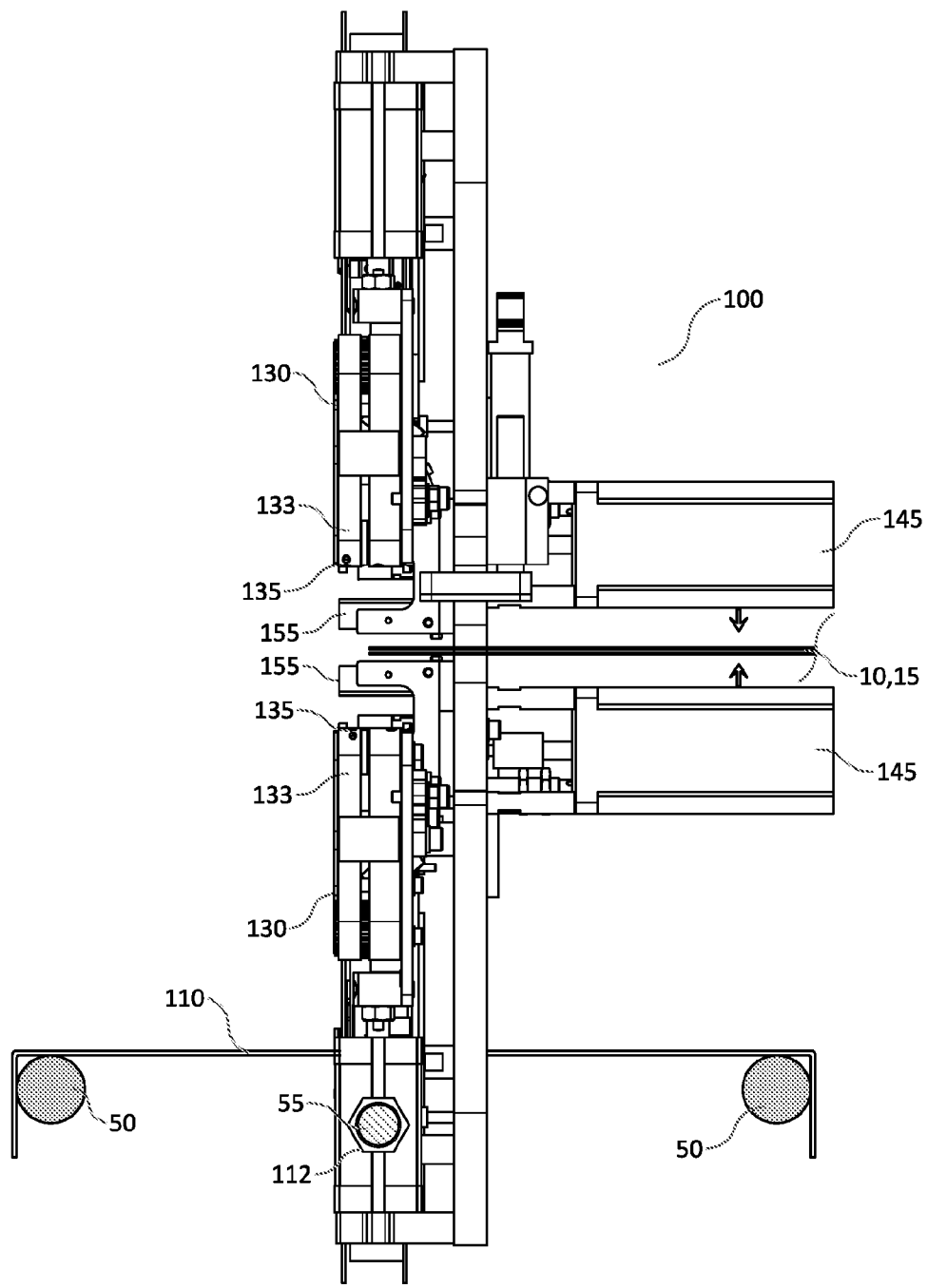
FIG. 4 shows a side view of the transport module with the applicator device of the device of FIG. 1.

The transport module applied for connecting the tube ends 15, 25 is shown in more detail in FIGS. 3 and 4 in respectively front view and side view. The shown installation is formed by a carriage 110 which carries transport module 100 over guide 50. Carriage 110 carries an applicator device 120 with a set of clamping blocks 145, which can be manipulated toward each other and fix the tail end of the active tubular foil therebetween. In many cases use is made for the tubular foil of a printed foil with a repeating print. It is important here that when the spent tubular foil is connected to the subsequent tubular foil, this repeating pattern is continued and maintained within a certain tolerance. With a view thereto, transport module 100 is provided with a registration photocell which, when end 15 of a tube 10 approaches, brings the tube transport motor to a standstill when a determined characteristic in the printed image is detected. In this position the clamping blocks are driven to fix the end, and the end is cut at the correct position by means of an actuable cutting blade 150 which has a line of operation transversely of the tube direction. The leading end 25 of the subsequent tubular foil 20 is shortened and chamfered manually at a corresponding pitch by an operator.

The applicator device 120 further comprises a set of opposite applicator members 130 whereby the adhesive strips 60, among other things, can be arranged. Applicator members 130 have mutually facing operative surfaces 135 and can be manipulated from the spread position shown in figures to a clamping position wherein the operative surfaces 135 lie clampingly on each other. The line of operation of cutting blade 150 lies in these operative surfaces 135 and the tail end 15 is advantageously clamped therebetween while being shortened with cutting blade 150. Applicator device 120 further comprises for each of the applicator members 130 supply means 140 for providing the adhesive strips 60 on the operative surfaces 135.

These supply means 140 comprise a driven reel 140 on which an adhesive tape 65 is receivable in rolled-up state. The supply means further comprises a cutting device with a cutting blade 155 whereby an adhesive strip 60 can be cut off the adhesive tape at a desired length. A system of guide rollers 141, 142 carries the adhesive tape 65 underneath a driven transport wheel 143 which supports resiliently on a counter-wheel 144. Advantageously applied here is a transport wheel with a curved running surface transversely of the direction of the adhesive tape so that contact with the adhesive side of the adhesive tape is limited, this preventing deposition of glue on the transport wheel and adhesion to the transport wheel. By imparting an optionally whole number of revolutions to the transport wheel the adhesive tape 65 is carried over a strip length corresponding therewith beyond cutting device 155. Cutting blade 155 then cuts the adhesive strip at this length.

FIGS. 5A-5F show schematically the handling of the adhesive strip in successive stages of processing. Transport wheel 143 imposes a predetermined strip length, which is adapted to a width of the tubular foil 10, 20, on adhesive tape 65 beyond cutting blade 155. Applicator members 130 are in the spread position and the adhesive tape is received on the operative surface. The two applicator members comprise internally and close to their operative surface an underpressure chamber 133. Underpressure chambers 133 are connected via conduits to a suction device (not further shown) which applies and maintains a sub-atmospheric underpressure in underpressure chambers 133. Operative surfaces 135 are air-permeable and are in open communication with underpressure chambers 133 on their back side so that the operative surfaces exert a suction force which engages on adhesive tape 65. Adhesive tape 65 will thus be pressed against the operative surface and stick thereto.

A non-transparent backing is advantageously used for the adhesive tape 65, particularly a shiny metallic backing, so that the adhesive strips 60 formed therefrom will be easily recognizable afterwards. This recognizability is advantageously utilized in the subsequent machine, with which the sleeves are placed around the products, by unmistakably recognizing thereby the product which was provided with a sleeve at the position of the connection between the tubular foils of a sleeve using a suitable sensor, so that it can be removed from the production line fully automatically. The sensor can here be an optical sensor, such as a camera, but advantageously comprises an inductive sensor whereby passage of an adhesive tape which is metallic or at least contains metal is detected in contactless manner.

Figure 5A:
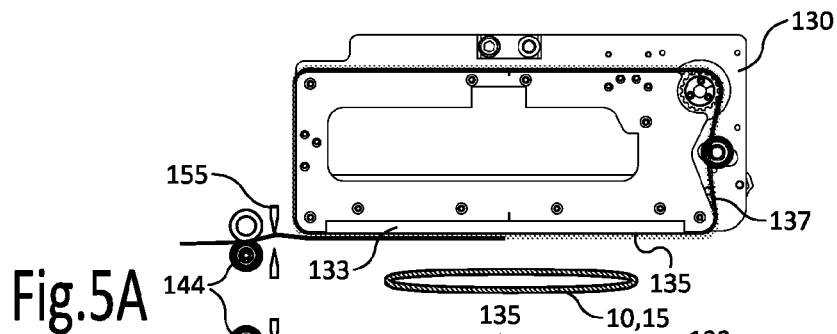
FIGS. 5A-5F show successive stages of the device of FIG. 1 in the realization of the connection of FIG. 2.
Figure 5B:
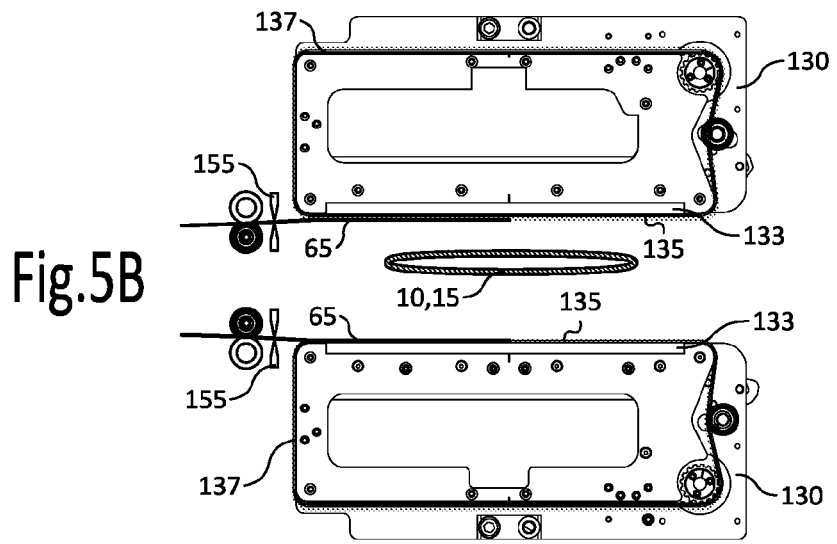
Figure 5C:
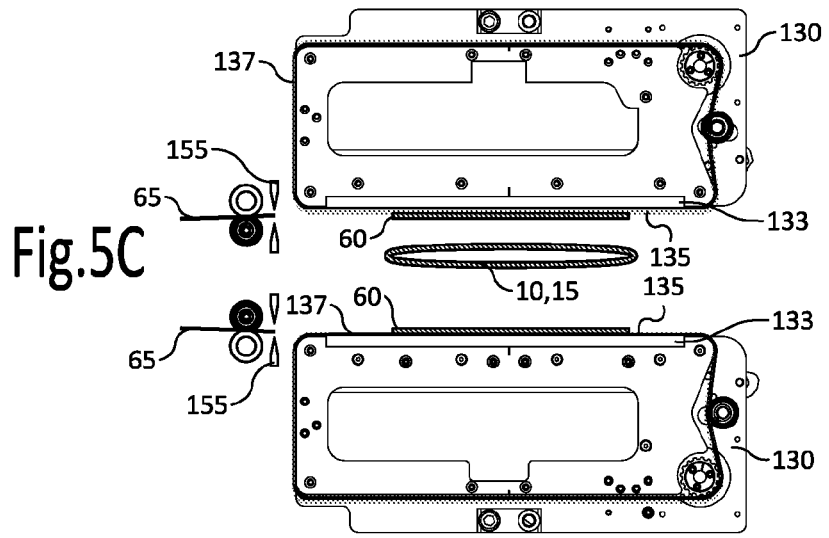

Operative surfaces 135 each form part of an endless belt 137 which runs over the applicator member 130 in question and is motor-driven. After adhesive tape 65 has been received over the strip length in the situation shown in FIG. 5A the operative surfaces 135 are displaced from this position, in which they receive adhesive tape 65, over a short distance so as to pull adhesive tape 65 taut, see FIG. 5B. In this situation cutting blades 155 are driven to detach the adhesive strip 60 with the desired length from the adhesive tape 65. This position, in which adhesive strip 60 is being detached, is shown in FIG. 5B.

Operative surfaces 135 are then once again displaced in order to centre or at least align the thus detached adhesive strips 60 relative to the tail end 10, 15 of the tubular foil. One or more electronic sensors, such as for instance a camera or the above described photocell, can be applied in order to ensure a correct positioning of adhesive strips 60 relative to end 15. For this purpose the drive motor of endless belt 137 and such sensors are coupled operatively to a control device for correctly positioning the adhesive strips 60 in this position in which the adhesive strips are being delivered, this position being shown in FIG. 5C.

Figure 5D:
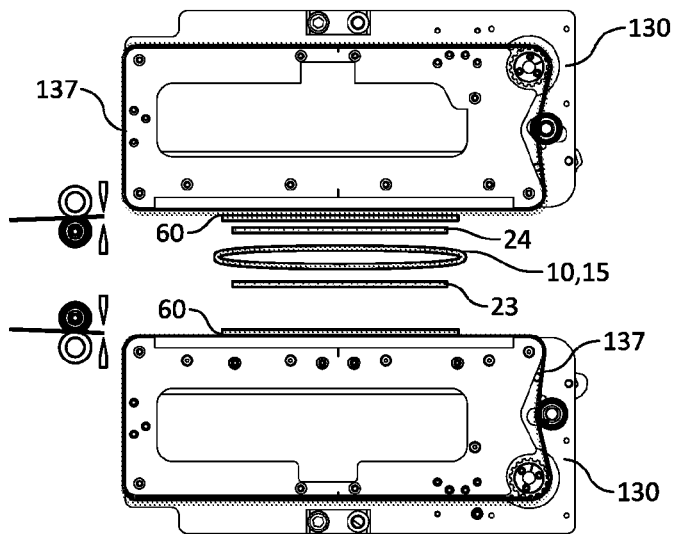
Figure 5E:
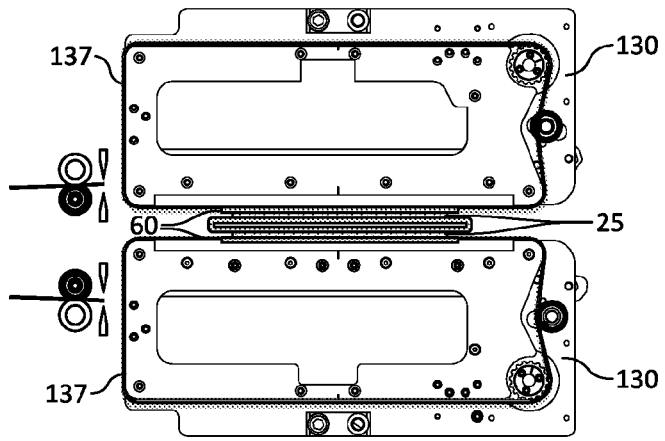
Figure 5F:
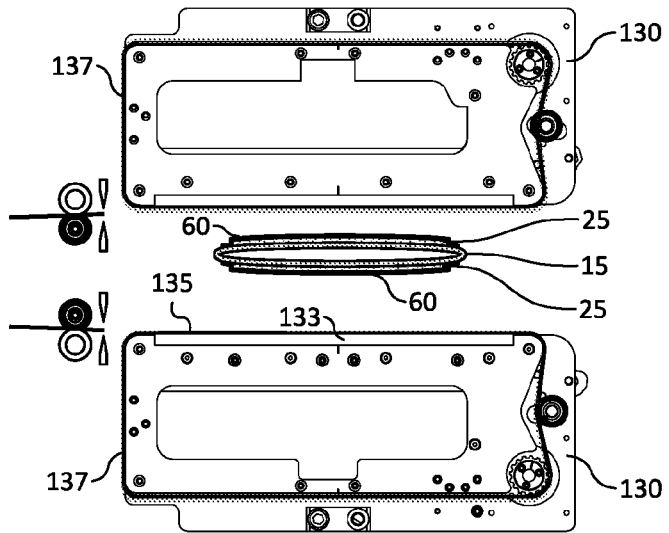

As described above, transport module 100 is driven laterally to the leading end 25 of a subsequent tubular foil. As shown in FIG. 5D, tail end 15 slides here laterally between the tongues 23, 24 which were formed on the mouth 22 of leading end 25. Once in this position, the applicator members are driven, whereby the operative surfaces are brought together so as to take up the clamping position shown in FIG. 5E. The applicator members here clamp the adhesive strips 60, as shown schematically in FIG. 2B, onto the overlap between the two ends 15, 25, whereby both ends are connected to each other, both mechanically and operatively, without interruption. The stages of FIGS. 5A-5C can optionally also be performed only once the two ends 15, 25, as shown in FIG. 5D, have been brought together. The sequence described here however has the advantage that the mutual connection can be made almost instantaneously after the tail end 15 has been placed inside the mouth 22 of leading end 25. The device hereby causes almost no time loss here.

The underpressure in underpressure chambers 133 is then eliminated, applicator members 130 are brought back to their spread position, and the clamping of clamping members 45, 145 is released. The two tubular foils 10, 20 are thus released by the device and the subsequent tubular foil 20 will now be supplied immediately following the spent tubular foil 10 by the device, see FIG. 5F.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art.

The invention claimed is:

1. A device for providing a tubular foil, comprising a frame with a position for an active product holder from which the tubular foil can be removed and at least one further position for at least one subsequent product holder with a subsequent tubular foil, comprising coupling means for attaching a leading end of the subsequent tubular foil to a tail end of a spent tubular foil, wherein the coupling means comprise a carriage onto which the tail end can be fixed, and wherein the carriage is controllable so as to bring the tail end of the spent tubular foil and the leading end of the subsequent tubular foil together, wherein the carriage comprises a drivable applicator device with opposite applicator members with mutually facing operative surfaces, wherein the applicator members can be manipulated between a spread position, wherein the operative surfaces lie removed from each other, and a clamping position wherein the operative surfaces lie clampingly on each other, wherein the applicator device comprises supply means for providing adhesive strips on the operative surfaces of the applicator members in the spread position, and wherein the applicator device can be controlled to bring the applicator members with the adhesive strips thereon into the clamping position, with interposing of the tail end of the spent tube and the leading end of the subsequent tube, in order to mutually connect the ends between the adhesive strips, and to bring the applicator members into the spread position in order to release the adhesive strips and the ends mutually connected thereby.

2. The device according to claim 1, wherein the supply means comprise for each of the operative surfaces a roll of adhesive tape which is provided with a drivable cutting device which, when driven, is able and configured to detach the adhesive strip from the adhesive tape.

3. The device according to claim 2, wherein the supply means comprise a driven transport wheel between the tape holder and the cutting device for the purpose of carrying the adhesive tape a strip length beyond the cutting device, which transport wheel has transversely of a transport direction a curved, particularly convex or concave, running surface.

4. The device according to claim 1, wherein the applicator members are provided with drivable attaching means which are able and configured when driven to have the operative surface exert an attractive force engaging on the adhesive strip.

5. The device according to claim 4, wherein the attaching means comprise an underpressure chamber on a back side of the operative surface, which underpressure chamber is coupled to a suction device which is able and configured to maintain a sub-atmospheric underpressure in the underpressure chamber, wherein the operative surface is air-permeable and is in open communication with the underpressure chamber on the back side.

6. The device according to claim 1, wherein each of the operative surfaces is displaceable between a starting position, in which the adhesive strip is received, and a delivery position in which the adhesive strip is delivered.

7. The device according to claim 6, wherein a sensor is provided for each operative surface for the purpose of detecting the tail end, and wherein the operative surface and the sensor are coupled to a control device in order to align the delivery position with the tail end.

8. The device according to claim 2, wherein the operative surface is displaceable between a starting position, in which the adhesive tape is received, and a position in which the adhesive strip is detached from the adhesive tape.

9. The device according to claim 6, wherein each of the operative surfaces comprises a part of a running surface of a driven endless belt.

10. The device according to claim 1, wherein the frame comprises at each position a suspension for a rotating roll from which the tubular foil can be unwound.

11. The device according to claim 1, wherein the frame comprises at each position a support surface for a subsequent tubular foil, on which the leading end of the tubular foil in question can be received, and wherein the support surface is provided with drivable fixation means which are able and configured when driven to fix the leading end in a defined position, particularly in a flat state of the tubular foil.

12. The device according to claim 11, wherein the leading end of the subsequent roll comprises a mouth accessible to the tail end, wherein spreading means are provided to open the mouth of the leading end, and wherein the carriage is able and configured to place the tail end of the active roll inside the opened mouth of the subsequent roll.

13. The device according to claim 12, wherein the mouth is laterally accessible to the tail end, wherein the carriage is guided with the tail end to the leading end in a lateral movement, and wherein the carriage is able and configured to place the tail end of the active roll laterally inside the opened mouth of the subsequent roll in the lateral movement.

14. The device according to claim 12, wherein the spreading means comprise a set of drivable suction nozzles above and under the mouth of the leading end of the subsequent tubular foil.

15. The device according to claim 1, wherein the carriage is provided with drivable fixation means which are able and configured when driven to fix the tail end in a defined position relative to the operative surface.

16. The device according to claim 15, wherein the carriage comprises a drivable cutting device having at the position of the operative surfaces a line of operation running transversely of a tube direction, which cutting means are able and configured when driven to shorten the tail end along the line of operation at the position of the operative surface.

17. The device according to claim 1, wherein an adhesive strip can be provided at each of the operative surfaces while the carriage moves to the subsequent tubular foil.

18. The device according to claim 1, wherein the frame comprises a buffer space for receiving therein an end part of the tubular foil which has been unwound from the active roll and which ends in the tail end.

* * * * *